US011085374B2

(12) United States Patent
Packer et al.

(10) Patent No.: US 11,085,374 B2
(45) Date of Patent: Aug. 10, 2021

(54) IMPINGEMENT INSERT WITH SPRING ELEMENT FOR HOT GAS PATH COMPONENT

(71) Applicant: General Electric Company, Schenectady, NY (US)

(72) Inventors: Travis J Packer, Lebanon, OH (US); Brad Wilson VanTassel, Greer, SC (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 16/701,408

(22) Filed: Dec. 3, 2019

(65) Prior Publication Data

US 2021/0164397 A1    Jun. 3, 2021

(51) Int. Cl.
*F02C 7/00* (2006.01)
*F02C 7/18* (2006.01)

(52) U.S. Cl.
CPC .......... *F02C 7/18* (2013.01); *F05D 2260/201* (2013.01)

(58) Field of Classification Search
CPC ... F01D 5/12; F01D 5/14; F01D 5/143; F01D 5/147; F01D 5/18; F01D 5/181; F01D 5/188; F01D 5/189; F01D 5/326
See application file for complete search history.

(56) References Cited

U.S. PATENT DOCUMENTS

| 3,540,810 | A | * | 11/1970 | Kercher | F01D 5/189 416/90 R |
| 3,806,275 | A | | 4/1974 | Aspinwall | |
| 4,063,851 | A | * | 12/1977 | Weldon | F01D 5/186 416/97 A |
| 4,153,386 | A | * | 5/1979 | Leogrande | F01D 5/188 415/115 |

(Continued)

FOREIGN PATENT DOCUMENTS

| EP | 1120177 B1 | 6/2007 |
| EP | 2758634 B1 | 10/2015 |
| GB | 2555632 A | 9/2018 |

OTHER PUBLICATIONS

EP Search Report, Office Action in U.S. Appl. No. 16/701,408, dated Mar. 19, 2021, (9 pages).

*Primary Examiner* — Phutthiwat Wongwian
*Assistant Examiner* — Sherman D Manley
(74) *Attorney, Agent, or Firm* — James Penrick; Hoffman Warnick LLC (57) ABSTRACT

An impingement insert for HGP component may include a hollow body having a longitudinal extent, an exterior surface and an interior surface. The hollow body may include a first side wall, a second side wall contiguous with the first side wall at a first end of each, the second side wall is flexibly movable relative to the first side wall. A spring element is contiguous with a second end of each of the first side wall and the second side wall, and extends along at least a portion of the longitudinal extent of the hollow body and (Continued)

into the hollow body between the first side wall and the second side wall. The spring element biases the side walls to an expanded position from a compressed position of the hollow body. Cooling passages pass between the exterior surface and the interior surface of the hollow body in both side walls.

20 Claims, 11 Drawing Sheets

(56) References Cited

U.S. PATENT DOCUMENTS

| | | | | |
|---|---|---|---|---|
| 4,252,501 | A * | 2/1981 | Peill | F01D 5/189 |
| | | | | 415/115 |
| 4,257,734 | A * | 3/1981 | Guy | F01D 9/041 |
| | | | | 415/115 |
| 4,403,917 | A * | 9/1983 | Laffitte | F01D 5/188 |
| | | | | 415/115 |
| 4,461,612 | A * | 7/1984 | Dodd | F01D 5/189 |
| | | | | 416/96 A |
| 4,482,295 | A * | 11/1984 | North | F01D 5/189 |
| | | | | 415/115 |
| 4,529,357 | A | 7/1985 | Holland | |
| 5,516,260 | A * | 5/1996 | Damlis | F01D 5/189 |
| | | | | 415/115 |
| 6,186,740 | B1 * | 2/2001 | Takeishi | F01D 5/189 |
| | | | | 416/96 A |
| 6,318,963 | B1 * | 11/2001 | Emery | F01D 5/186 |
| | | | | 416/96 A |
| 6,428,270 | B1 | 8/2002 | Leone et al. | |
| 6,572,335 | B2 | 6/2003 | Kuwabara et al. | |
| 8,257,035 | B2 | 9/2012 | Schilp | |
| 9,133,717 | B2 * | 9/2015 | Nakamata | F01D 5/189 |
| 9,470,095 | B2 | 10/2016 | Propheter-Hinckley et al. | |
| 9,777,581 | B2 * | 10/2017 | Nilsson | F01D 5/189 |
| 9,863,254 | B2 | 1/2018 | Ceglio et al. | |
| 10,240,470 | B2 * | 3/2019 | Hagan | F01D 9/065 |
| 10,533,427 | B2 * | 1/2020 | Marsh | F01D 5/189 |
| 10,753,216 | B2 * | 8/2020 | Spangler | F01D 9/041 |
| 10,934,857 | B2 * | 3/2021 | Spangler | F01D 5/189 |
| 2002/0090294 | A1 * | 7/2002 | Keith | F01D 5/189 |
| | | | | 415/115 |
| 2009/0165924 | A1 * | 7/2009 | Steibel | F01D 5/147 |
| | | | | 156/89.11 |
| 2012/0219402 | A1 * | 8/2012 | Harding | F01D 5/189 |
| | | | | 415/115 |
| 2014/0093379 | A1 * | 4/2014 | Tibbott | F01D 5/189 |
| | | | | 416/224 |
| 2016/0146018 | A1 | 5/2016 | Metternich et al. | |
| 2017/0198600 | A1 * | 7/2017 | Propheter-Hinckley | F01D 17/12 |
| 2017/0268345 | A1 | 9/2017 | Groves, II et al. | |
| 2018/0023398 | A1 | 1/2018 | Jones et al. | |
| 2018/0128117 | A1 * | 5/2018 | Rawlinson | F01D 5/189 |
| 2018/0135464 | A1 * | 5/2018 | Propheter-Hinckley | F04D 29/542 |
| 2018/0163555 | A1 * | 6/2018 | Snider | F01D 5/18 |
| 2019/0048726 | A1 * | 2/2019 | Spangler | F01D 5/282 |

* cited by examiner

IMPINGEMENT INSERT WITH SPRING ELEMENT FOR HOT GAS PATH COMPONENT

BACKGROUND OF THE INVENTION

The disclosure relates generally to turbomachinery, and more particularly, to an impingement insert for a hot gas path (HGP) component that includes a spring element allowing a hollow body thereof to move between a compressed and an expanded position.

An impingement insert or sleeve includes a hollow body having cooling passages in a wall thereof that allow delivery of a coolant through the cooling passages to impact or impinge on a surface to be cooled. Impingement inserts are used in a variety of HGP components in turbomachinery to increase cooling performance of cooling circuitry therein. One indicator of cooling performance of an insert is the Z/D parameter, which is a ratio of a distance D between the insert and interior surface of the HGP component and a diameter D of the cooling passages (holes) in the impingement insert. The Z/D parameter value of an insert is typically designed to be within a desired range that results in better cooling performance. One challenge with impingement inserts is positioning the impingement insert within a cavity in an already formed HGP component, but also positioning the insert in a sufficiently close manner to allow for high cooling performance, i.e., observed by a lower Z/D parameter. One approach includes providing the impingement insert in a number of flexible, longitudinal sections to make it easier to insert them into the HGP component. However, having to sequentially position and couple a number of insert sections together or couple them to the HGP component, increases the complexity, time and costs of manufacture. Flexible impingement insert sections also do not provide a contiguous element about their periphery, i.e., laterally (cross-section), which can detract from cooling performance where they are discontinuous.

BRIEF DESCRIPTION OF THE INVENTION

A first aspect of the disclosure provides an impingement insert for a hot gas path (HGP) component, the impingement insert comprising: a hollow body having a longitudinal extent, an exterior surface and an interior surface, the hollow body further including: a first side wall, a second side wall contiguous with the first side wall at a first end of each, the second side wall configured to be flexibly movable relative to the first side wall, and a spring element contiguous with a second end of each of the first side wall and the second side wall, the spring element extending along at least a portion of the longitudinal extent of the hollow body and into the hollow body to be between the first side wall and the second side wall, the spring element biasing the first side wall and the second side wall to an expanded position of the hollow body from a compressed position of the hollow body; and a plurality of cooling passages in at least the first side wall and the second side wall, the plurality of cooling passages passing between the exterior surface and the interior surface of the hollow body.

A second aspect of the disclosure provides a hot gas path (HGP) component, comprising: a component body having a hollow cavity therein; an impingement insert for mounting in the hollow cavity, the impingement insert including: a hollow body having a longitudinal extent, an exterior surface and an interior surface, the hollow body further including: a first side wall, a second side wall contiguous with the first side wall at a first end of each, the second side wall configured to be flexibly movable relative to the first side wall, and a spring element contiguous with a second end of each of the first side wall and the second side wall, the spring element extending along at least a portion of the longitudinal extent of the hollow body and into the hollow body to be between the first side wall and the second side wall, the spring element biasing the first side wall and the second side wall to an expanded position of the hollow body from a compressed position of the hollow body; and a plurality of cooling passages in at least the first side wall and the second side wall, the plurality of cooling passages passing between the exterior surface and the interior surface of the hollow body.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within, for example, a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine GT system or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the GT system, and "aft" referring to the rearward or turbine end of the GT system. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an impingement insert for an HGP component and an HGP component that includes the impingement insert. The impingement insert, which may also be referred to as an impingement sleeve, includes a hollow body having a longitudinal extent, an exterior surface and an interior surface. The hollow body may include a first side wall and a second side wall contiguous with the first side wall at a first end of each. The second side wall is flexibly movable relative to the first side wall. A spring element is contiguous with a second end of each of the first side wall and the second side wall, and extends along at least a portion of the longitudinal extent of the hollow body. The spring element also extends into the hollow body between the first side wall and the second side wall. The spring element biases the side walls to an expanded position from a compressed position of the hollow body. Cooling passages pass between the exterior surface and the interior surface of the hollow body in both side walls. The impingement insert is compressible and/or flexible laterally such that it can be compressed, inserted into a hollow cavity in an already formed HGP component, released to fill the shape of the hollow cavity and fixed into position. The impingement insert extends an entire length of the hollow cavity in the HGP component, i.e., it is not sectioned, making its insertion a one-step operation. Further, the impingement insert is contiguous laterally, i.e., in a circumferential cross-section, so as to avoid creating areas of poor cooling performance.

Figure 1:
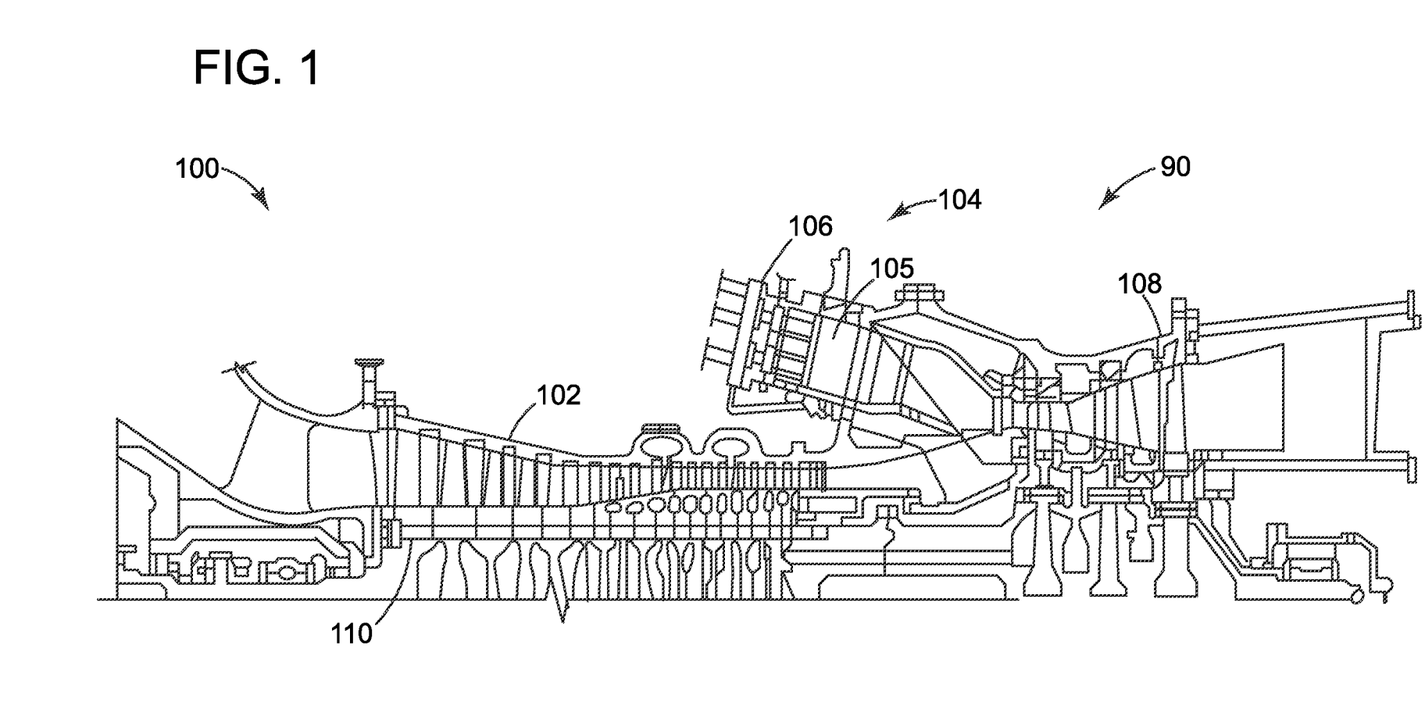
FIG. 1 shows a schematic view of an illustrative gas turbine system.

FIG. 1 shows a schematic illustration of an illustrative machine in the form of a turbomachine 90 that may include a hot gas path (HGP) component including an impingement insert according to embodiments of the disclosure. In the example shown, turbomachine 90 includes a gas turbine (GT) system 100 that includes a compressor 102 and a combustor 104. Combustor 104 includes a combustion region 105 and a fuel nozzle assembly 106. GT system 100 also includes a turbine 108 and a common compressor/ turbine shaft 110 (sometimes referred to as rotor 110). In one embodiment, GT system 100 is a MS7001FB GT system, sometimes referred to as a 9FB GT system, commercially available from General Electric Company, Greenville, S.C. The present disclosure is not limited to any one particular GT system and may be implanted in connection with other GT systems including, for example, the MS7001FA (7FA) and MS9001FA (9FA) GT system models of General Electric Company.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
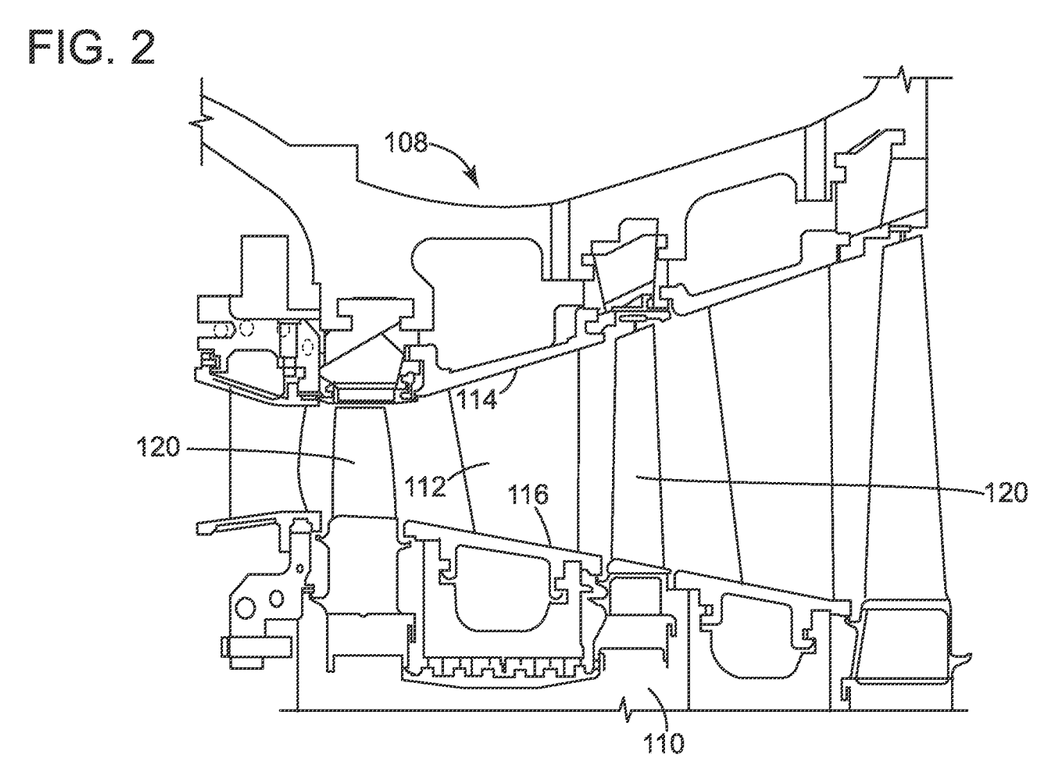
FIG. 2 shows a cross-sectional view of an illustrative gas turbine assembly with a three stage nozzle that may be used with the GT system in FIG. 1.
Figure 4:
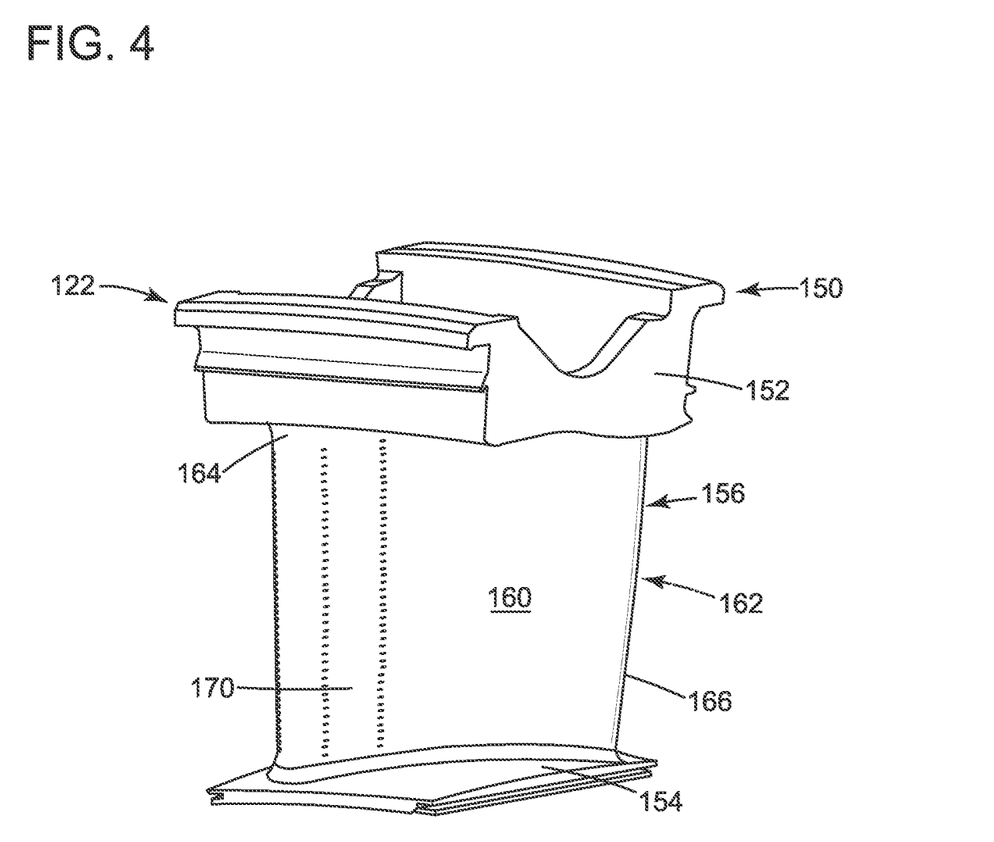
FIG. 4 shows a perspective view of a turbine nozzle or vane of the type in which embodiments of the present disclosure may be employed.

FIG. 2 shows a cross-sectional illustration of an illustrative turbine 108 with a three stage nozzle that may be used with GT system 100 in FIG. 1. Turbine 108 includes a stationary vane 112. Stationary vane 112 is held in the turbine assembly 108 by a radially outer platform 114 and a radially inner platform 116. Stationary vane 112 may include one or more circumferentially spaced airfoils 156 (FIG. 4). Rotating blades 120 are coupled to rotor 110 and extend between rows of stationary vanes 112. As will be further described, combustion gases are directed by stationary vanes 112 against rotating blades 120 to turn rotor 110.

Figure 3:
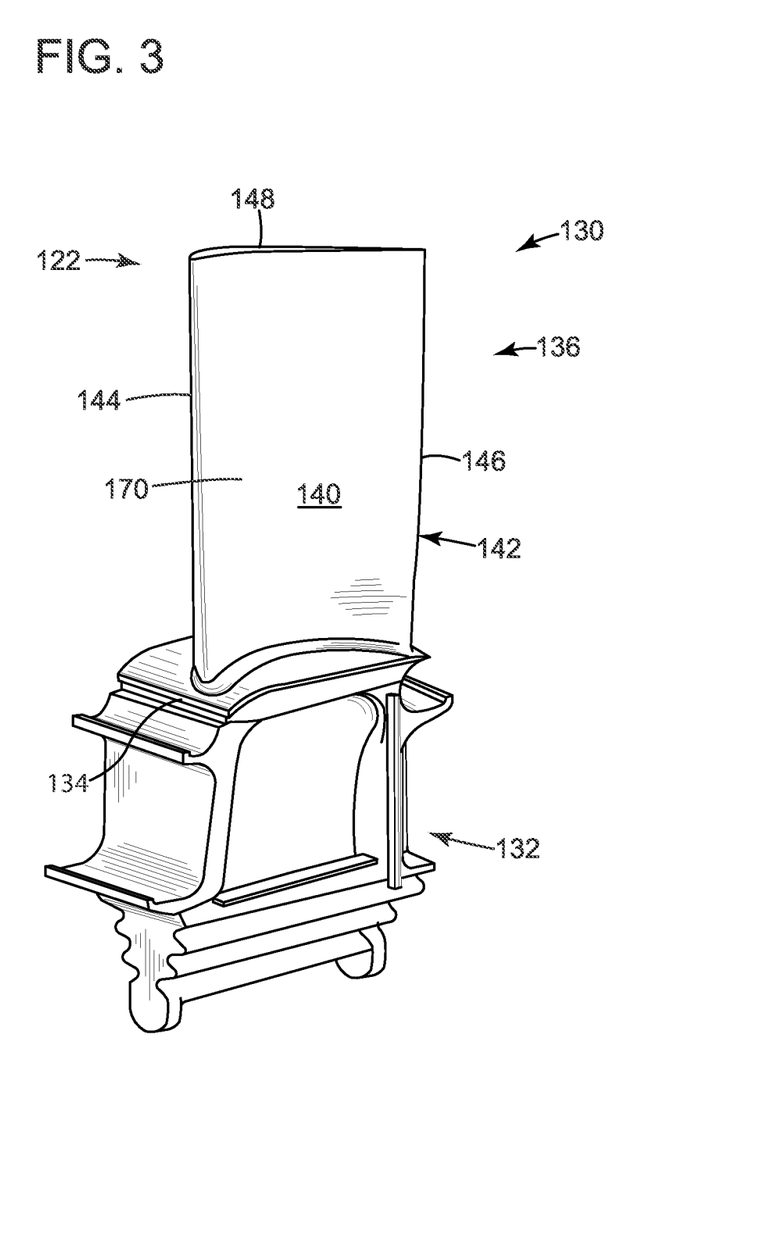
FIG. 3 shows a perspective view of a turbine rotor blade of the type in which embodiments of the present disclosure may be employed.

FIGS. 3 and 4 show illustrative HGP components 122 of GT system 100 in which an impingement insert according to embodiments of the disclosure may be employed. FIG. 3 shows a perspective view of a turbine rotor blade 130 of the type in which embodiments of the present disclosure may be employed. Turbine rotor blade 130 includes a root 132 by which rotor blade 130 attaches to rotor 110 (FIGS. 1-2). Root 132 may include a dovetail configured for mounting in a corresponding dovetail slot in the perimeter of the rotor disc. Root 132 may further include a shank that extends between the dovetail and a platform 134, which is disposed at the junction of airfoil 136 and root 132 and defines a portion of the inboard boundary of the flow path through turbine 108. It will be appreciated that airfoil 136 is the active component of rotor blade 130 that intercepts the flow of working fluid and induces the rotor disc to rotate. It will be seen that airfoil 136 of rotor blade 130 includes a concave pressure side (PS) outer wall 140 and a circumferentially or laterally opposite convex suction side (SS) outer wall 142 extending axially between opposite leading and trailing edges 144, 146 respectively. Outer walls 140 and 142 also extend in the radial direction from platform 134 to an outboard tip 148.

FIG. 4 shows a perspective view of a stationary nozzle or vane 150 of the type in which embodiments of the present disclosure may be employed. Stationary vane 150 includes an outer platform 152 by which stationary vane 150 attaches to a casing of the turbomachine. Outer platform 152 may include any now known or later developed mounting configuration for mounting in a corresponding mount in the casing. Stationary vane 150 may further include an inner platform 154 for positioning between adjacent turbine rotor blades 120, 130 (FIGS. 2 and 3) platforms 134 (FIG. 3). Platforms 152, 154 define respective portions of the outboard and inboard boundary of the flow path through GT system 100. It will be appreciated that airfoil 156 is the active component of stationary vane 150 that intercepts the flow of working fluid and directs it towards turbine rotor blades 130 (FIG. 3). It will be seen that airfoil 156 of stationary vane 150 includes a concave pressure side (PS) outer wall 160 and a circumferentially or laterally opposite convex suction side (SS) outer wall 162 extending axially between opposite leading and trailing edges 164, 166 respectively. Outer walls 160 and 162 also extend in the radial direction from platform 154 to platform 152.

Figure 5:
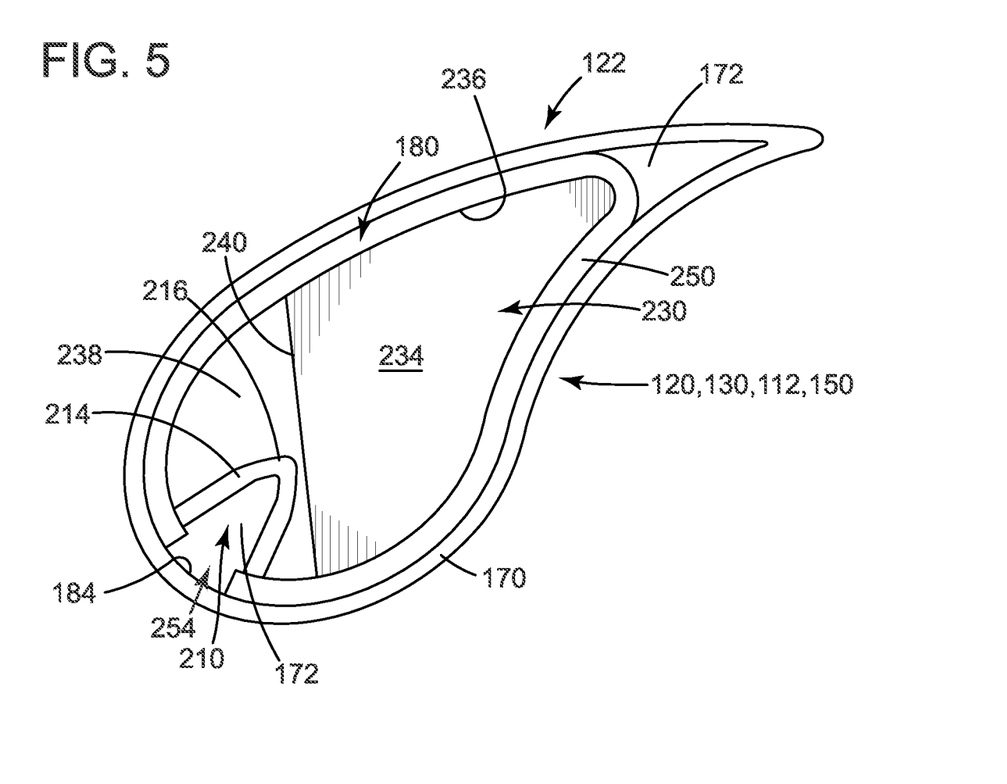
FIG. 5 shows a top down view of an HGP component including an impingement sleeve with a spring element, according to one embodiment of the disclosure.

As understood in the art, an impingement insert may be employed in HGP component 122 of, for example, GT system 100, to distribute a cooling fluid to the HGP component. HGP component 122 may include, for example, rotating blade 130 or stationary vane 150, and/or airfoils 136, 156 thereof. FIG. 5 shows a schematic view of an illustrative HGP component 122 including a hollow cavity 172 in a component body 170 thereof, e.g., in either of airfoils 136, 156 (FIGS. 3 and 4). That is, HGP component 122 includes component body 170 having hollow cavity 172 therein into which an impingement insert 180 is positioned. Typically, a coolant like air or steam is supplied to an interior of impingement insert 180, and exits through cooling passages (not shown in FIG. 5) therein. The exiting coolant impinges on an interior surface 184 of HGP component 122 and cools the HGP component. Where HGP component includes an airfoil 136, 156, it may include hollow cavity 172 therein that extends a substantial portion of a length thereof. Embodiments of an impingement insert 180 according to embodiments of the disclosure can be applied in hollow cavity 172 in, for example, airfoil(s) 136, 156 (FIGS. 3 and 4). As will be described, hollow body 190 is contiguous in a chordwise direction of the airfoil, i.e., in a circumferential cross-section of the airfoil. While the teachings of the disclosure will be described relative to GT system 100, rotating blades 120, 130 and stationary vanes 112, 150 and airfoils 136, 156 thereof, it is emphasized that the teachings are not limited to only these applications. Impingement inserts 180 according to embodiments of the disclosure can be applied to a wide variety of other applications, all of which are considered within the scope of the disclosure.

Figure 6:
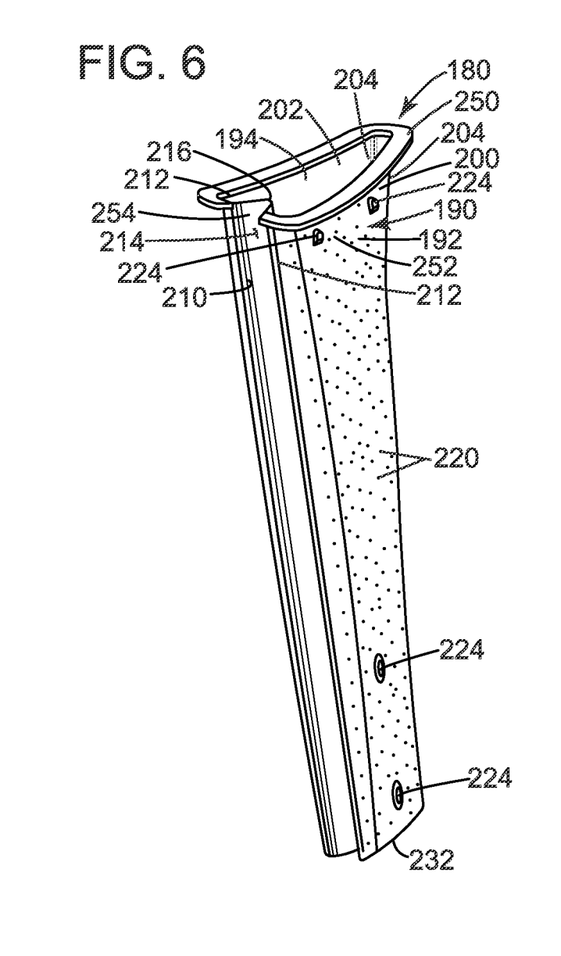
FIG. 6 shows a perspective view of an impingement insert with a spring element, according to embodiments of the disclosure.
Figure 7:
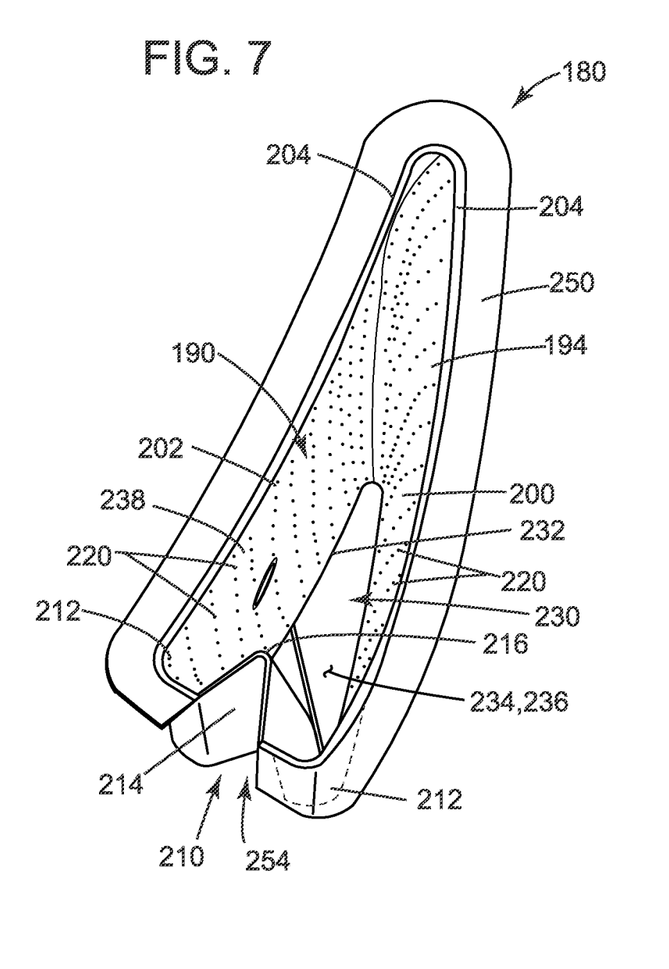
FIG. 7 shows a top down view of the impingement insert of FIG. 6.
Figure 8:
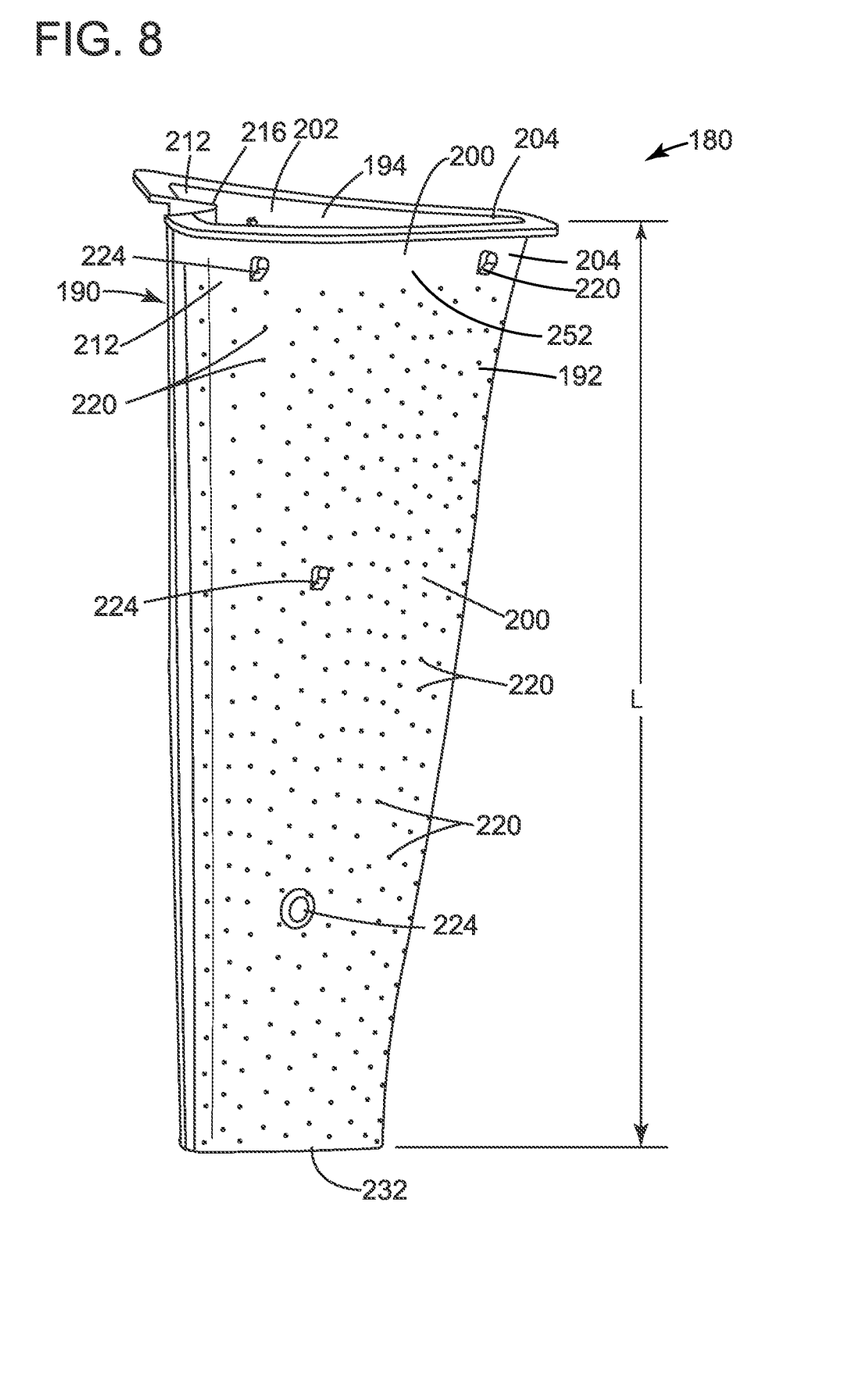
FIG. 8 shows a side view of the impingement insert of FIG. 6.

FIGS. 6-8 show various views of an impingement insert 180 according to embodiments of the disclosure. FIG. 6 shows a perspective view, FIG. 7 shows a top down view, and FIG. 8 shows a side view, of an impingement insert 180 according to embodiments of the disclosure. Impingement insert 180 includes a hollow body 190 having a longitudinal extent L (FIG. 8 only), exterior surface 192 and an interior surface 194. Longitudinal extent L may be any length necessary for operation of the particular impingement insert 180, which depends on its function. An impingement insert 180 may have a length L to match that of hollow cavity 172 of component body 170, e.g., in a vane or blade. In this regard, use of impingement insert 180 allows a one-step operation of inserting the impingement insert into the HGP component. Hollow body 190 may also include a first side wall 200 and a second side wall 202. Second side wall 202 is contiguous with first side wall 200 at a first end 204 of each. That is, first and second side wall 200, 202 have no seam or joint therebetween at first end 204. As illustrated, first and second side wall 200, 202 are angled relative to one another and may each have a shape to parallel interior surface 184 of hollow cavity 172 of HGP component 122.

Side walls 200, 202 are configured to be flexibly movable relative to one another. That is, first side wall 200 and second side wall 202 can bend relative to one another, e.g., towards one another, without breaking. Hollow body 190 also includes a spring element 210 contiguous with a second end 212 of each of first side wall 200 and second side wall 202. Second ends 212 of side walls are spaced from one another such that spring element 200 may extend along at least a portion of the longitudinal extent L (FIG. 6) of hollow body 190. In the example shown, spring element 210 extends an entire length of hollow body 190, but this is not necessary in all cases. Spring element 210 also extends into hollow body 190 to be between first side wall 200 and second side wall 202. That is, spring element 210 extends between side walls 200, 202, as it extends inwardly into hollow body 190. Spring element 210 extending into hollow body 190 between first side wall 200 and second side wall 202 provides a smaller, more compact, footprint for impingement insert and makes it easier to insert into HGP component 122.

As shown in FIGS. 6-8, impingement insert 180 may also include a plurality of cooling passages 220 in at least first side wall 200 and second side wall 202. Cooling passages 220 pass between exterior surface 192 and interior surface 194 of hollow body 190. Cooling passages 220 allow coolant to pass from hollow body 190 to impinge interior surface 184 (FIG. 5) of hollow cavity 172 in component body 170 of HGP component 122. Any number, shape, size or arrangement of cooling passages 220 may be provided.

Figure 9:
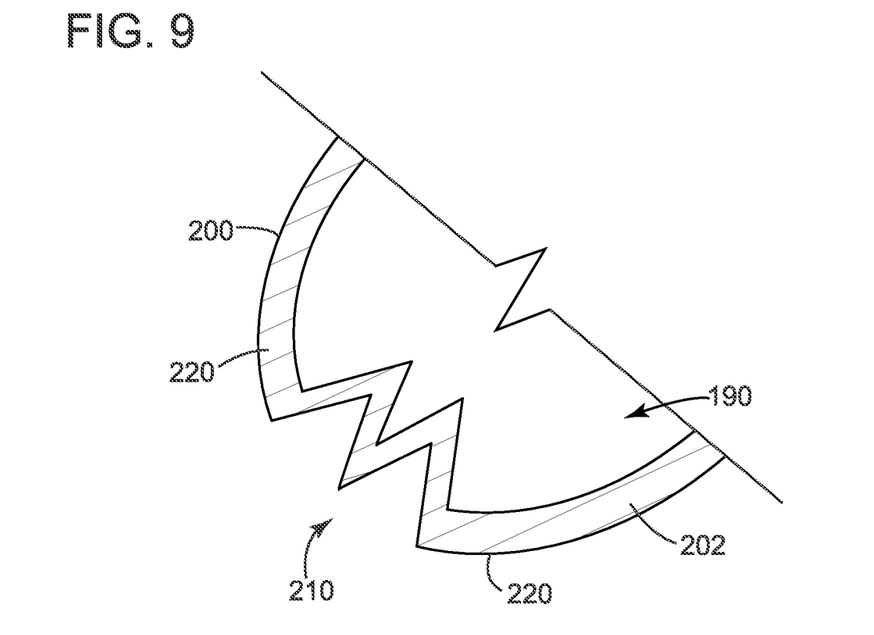
FIG. 9 shows an enlarged top down, partial cross-sectional view of a spring element according to another embodiment of the disclosure.
Figure 10:
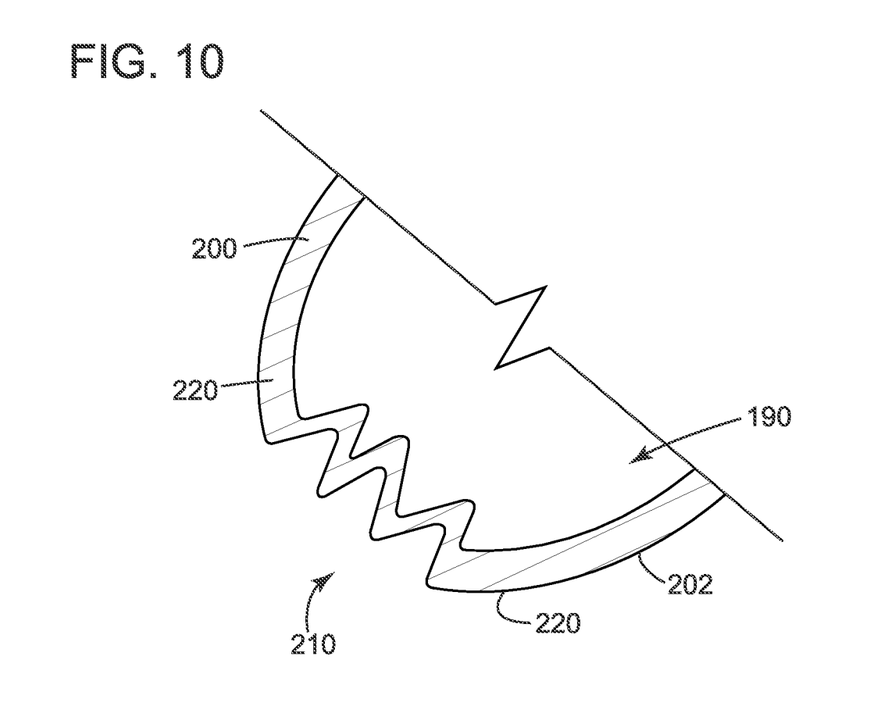
FIG. 10 shows an enlarged top down, partial cross-sectional view of a spring element according to another embodiment of the disclosure.
Figure 11:
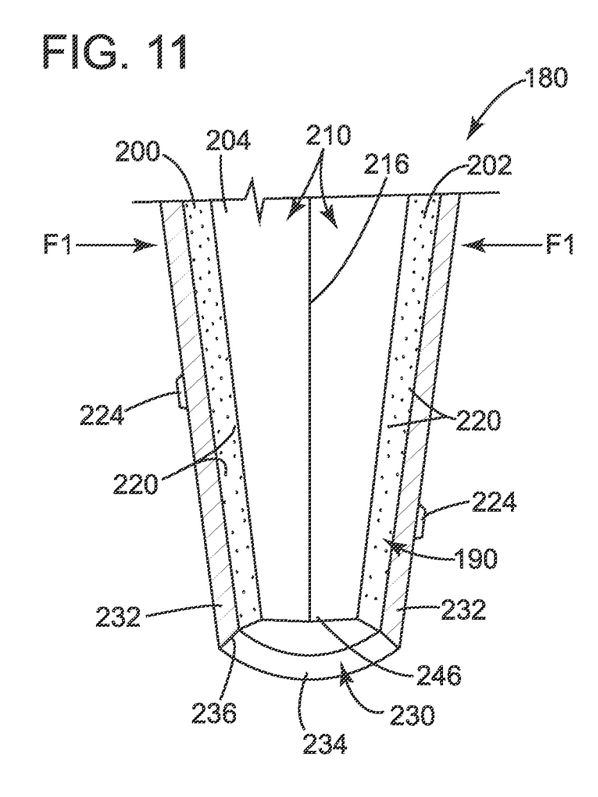
FIG. 11 shows an enlarged, side, partial cross-sectional view of a closure for an impingement insert in a compressed position, according to an embodiment of the disclosure.
Figure 15:
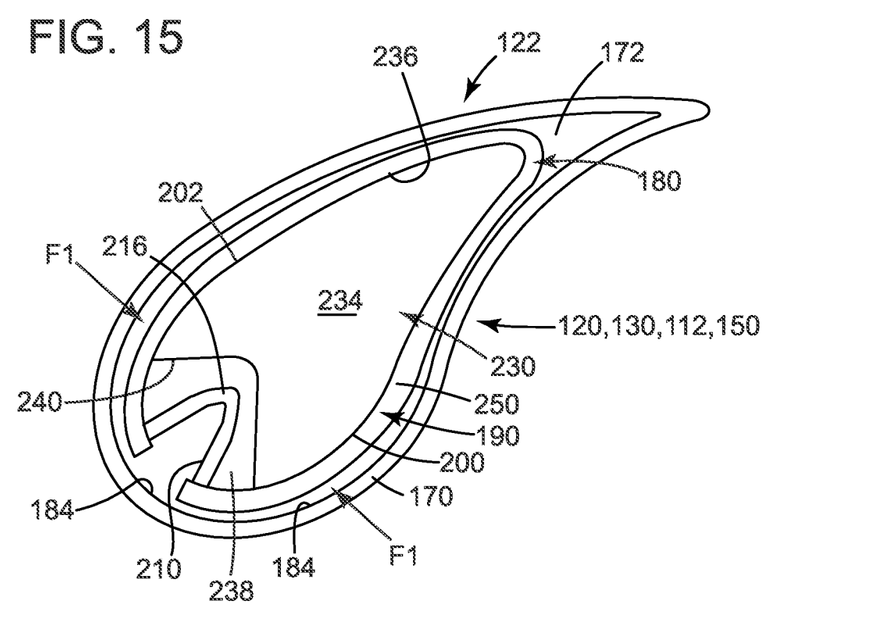
FIG. 15 shows a top down view of an impingement insert in a compressed position for insertion into an HGP component, according to an embodiment of the disclosure.
Figure 16:
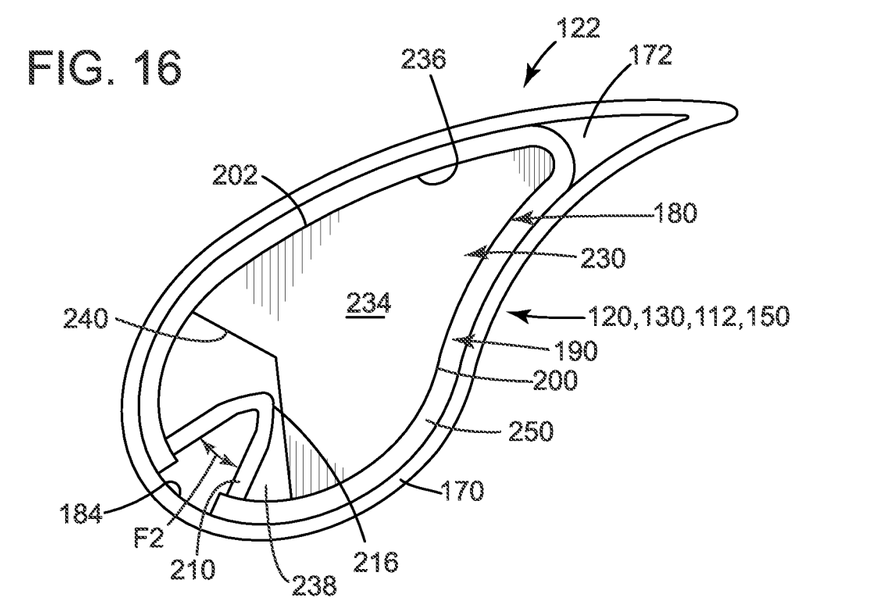
FIG. 16 shows a top down view of the impingement insert from FIG. 15 in an expanded (and mounted) position in an HGP component, and an HGP component, according to an embodiment of the disclosure.

Spring element 210 biases first side wall 200 and second side wall 202 to an expanded position of hollow body 190, shown in FIGS. 5-8, 12-14 and 16, from a compressed position of hollow body 190, shown in FIGS. 11 and 15. Spring element 210 may include any now known or later developed spring capable of withstanding the environment of HGP component 122, and providing sufficient force F2 (FIG. 12) to expand first and second side wall 200, 202. In one embodiment, shown in FIGS. 5-8, 11-16, spring element 210 includes a V-spring 214 having a point 216 thereof extending into hollow body 190 between first side wall 200 and second side wall 202. In other examples, shown in the enlarged top down, partial cross-sectional views of FIGS. 9 and 10, spring element 210 may have a sinusoidal shape with any number of waves therein, e.g., with two (W-shaped in FIG. 9) or more peaks (FIG. 10). Other shapes for spring element 210 may also be possible.

As shown best in FIGS. 6 and 8, impingement insert 180 may also include a plurality of supports 224 on exterior surface 192 of first side wall 200 and second side wall 202 of hollow body 190. Supports 224 may position hollow body 190 relative to interior surface 184 (FIG. 5) of hollow cavity 172 of HGP component 122, and may assist in heat transfer. Any number of supports 224 operable to position impingement insert 180 relative to interior surface 184 (FIG. 5), or provide the desired heat transfer, can be used. Supports 224 can have any desired shape configured to position the insert relative to interior surface 184 (FIG. 5) and/or provide the desired heat transfer, e.g., fins, pins and/or chevrons, etc.

Figure 12:
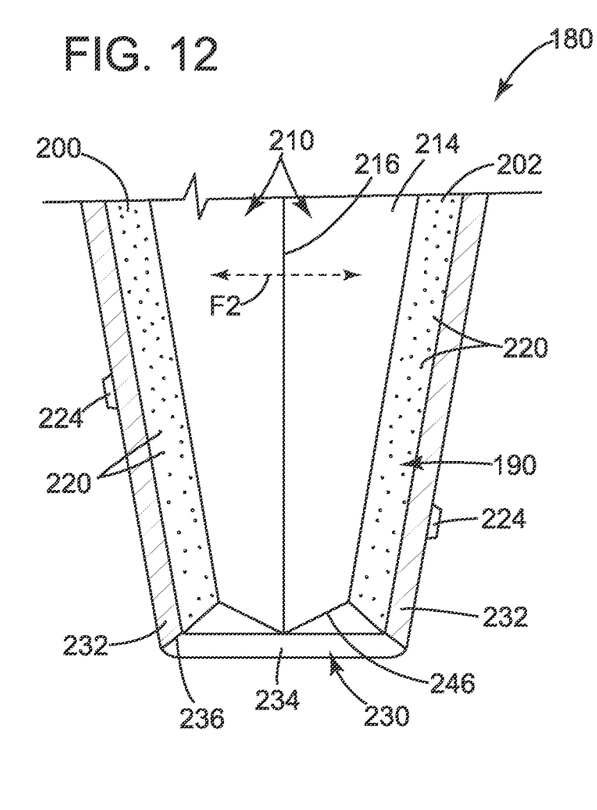
FIG. 12 shows an enlarged, side, partial cross-sectional view of the closure for the impingement insert from FIG. 11 in an expanded position, according to an embodiment of the disclosure.
Figure 13:
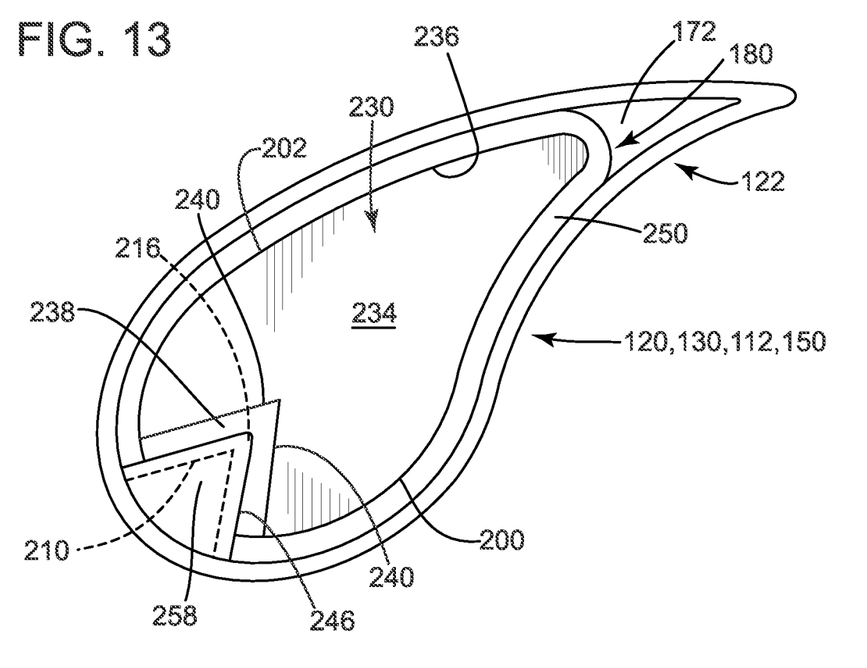
FIG. 13 shows a top down view of a cover for an impingement insert, according to an embodiment of the disclosure.
Figure 14:
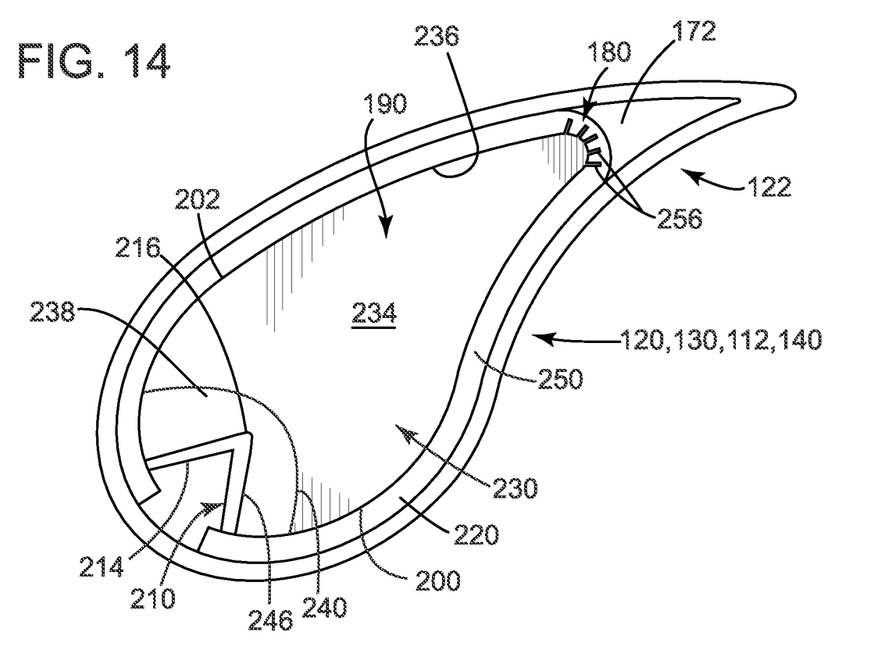
FIG. 14 shows a top down view of a cover for an impingement insert, according to another embodiment of the disclosure.

As shown in FIGS. 5, 7, 11-16, impingement insert 180 also may include a closure 230 on a first, radially inner end 232 (FIGS. 11-12) of hollow body 190. FIG. 11 shows a cross-sectional view of an end of hollow body 190 in a compressed position, and FIG. 12 shows a cross-sectional view of an end of hollow body 190 in an expanded position. As shown best in FIGS. 5 and 7, closure 230 may include a solid portion 234 for closing a first portion 236 of first end 232 of hollow body 190 and leaving a second portion 238 of first end 232 of hollow body 190 open. Closure 230 may be coupled to first end 232 in any now known or later developed manner, e.g., welding, additively manufactured together, etc. Closure 230 may be shaped to match a shape of first portion 236 between first side wall 200 and second side wall 202, e.g., partially shaped like a circumferential cross-section of an airfoil. Closure 230 may have any shaped edge 240 that defines open second portion 238 with remaining edges of first side wall 200 and second side wall 202. In addition, edge 240 of closure 230 may be shaped and positioned to allow open second portion 238 to provide sufficient space for spring element 210 movement. In this regard, as shown in FIGS. 11 and 12, an end 246 of spring element 210 adjacent first end 232 of hollow body 190 is free to move within (open) second portion 238 of first end 232 of hollow body 190 not closed by closure 230, i.e., as spring element 210 moves between the expanded and compressed positions. In FIGS. 5 and 7, edge 240 is linear, but for example, in FIG. 13, edge 240 is V-shaped, and in FIG. 14, edge 240 is curved. FIGS. 11 and 12 illustrate that solid portion 234 of closure 230 may be configured to flex with first side wall 200 and second side wall 202 of hollow body 190 as the side walls move between an expanded position, shown in FIG. 12, of hollow body 190 and, as shown in FIG. 11, a compressed position of hollow body 190. As illustrated, solid portion 234 may bow outwardly from hollow body 190 to accommodate the compression, but this may not be necessary in all instances. Solid portion 234 may be configured to flex in any now known or later developed manner, e.g., made of flexible metal, formed slightly curved, slotted or otherwise structured to accommodate flexing. Solid portion 234 could also be configured to bow inwardly into hollow body 190. In an expanded position, shown in FIG. 12, solid portion 234 may be substantially planar.

Impingement insert 180 may also optionally include any now known or later developed cover 250. Impingement insert 180 can also be devoid of a cover. A cover 250 may be provided for connection to interior surface 184 of hollow cavity 172, near an end of the hollow cavity, to seal or reduce flow out of an end of the space between exterior surface 192 (FIG. 8) of hollow body 190 and interior surface 184 (FIG. 5) of hollow cavity 172 of HGP component 122. Cover 250 may also act to space impingement insert from interior surface 184 of hollow cavity 172. As shown for example in FIGS. 6 and 8, cover 250 may extend laterally outward on a second end 252 of hollow body 190 opposing first end 232 (FIG. 6) of hollow body 190. Cover 250 is configured to be coupled to HGP component 122, e.g., it has an inner shape to match hollow body 190 at the end thereof. Cover 250 can be coupled to hollow body 190, for example, by welding. Cover 250 may be a flexible member that includes a gap 254 defined therein at a location of spring element 210 to provide some flexibility. That is, cover 250 may not be continuous where spring element 210 exists, e.g., to allow spring element 210 to move, and cover 250 to flex as hollow body 190 is compressed. Gap 254 may have any size capable of providing the desired flexibility. In another embodiment, shown in FIG. 13, impingement insert 180 may include a triangular cover 258 fixed over spring element 210, e.g., welded together once the insert is in position in HGP component 122. In another embodiment, shown in FIG. 14, cover 250 may include a plurality of spaced slots 256 therein that allow it to flex, but can be welded into a fixed location once impingement insert 180 is in position in HGP component 122.

Referring to FIGS. 11, 12, 15 and 16, in operation, impingement insert 180 can be forced into a compressed position by application of force F1, as shown in FIGS. 11 and 15. In the compressed position, side walls 200, 202 of hollow body 190 are moved closer together. Cover 250 may also flex and be compressed, as shown in FIG. 11. As shown in FIG. 15, in the compressed position, hollow body 190 is insertable in hollow cavity 172 of HGP component 122. Impingement insert 180 may extend the entire longitudinal extent of hollow cavity 172, which allows the entire impingement insert 180 to be inserted in one step and avoids having to position a number of impingement insert sections. Impingement insert 180 also avoids having to couple a number of impingement insert sections, as may be required in conventional settings. Once inserted in hollow cavity 172 of HGP component 122, force F1 (FIGS. 11 and 15) can be removed, allowing spring element 210 to move impingement insert 180 to the expanded position, shown in FIGS. 12 and 16. In the expanded position shown in FIG. 16, hollow body 190 of impingement insert 180 expands to engage interior surface 184 of hollow cavity 172 of HGP component 122. Supports 224 (FIGS. 6 and 8) position impingement insert 180 at the desired distance away from interior surface 184. Once in position, impingement insert 190 can be coupled to HGP component 122, e.g., by welding (e.g., spot welding) impingement insert 180 and/or cover 250 (when provided) to HGP component 122.

Impingement inserts 180, closure 230 and/or cover 250 may be made by any now known or later developed process, e.g., stamping and welding, additive manufacture, etc.

Embodiments of the disclosure provide an impingement insert and HGP component including an impingement insert that provides improved cooling performance by positioning the insert closer to the interior surface of the HGP component, e.g., airfoil inner wall. By having a flexible insert that can expand, the insert can be easily inserted but end up closer to the targeted interior surface, allowing greater cooling effectiveness with less coolant flow and with a better Z/D parameter value.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An impingement insert for a hot gas path (HGP) component, the impingement insert comprising:
   a hollow body having a longitudinal extent, an exterior surface and an interior surface, the hollow body further including:
   a first side wall,
   a second side wall contiguous with the first side wall at a first end of each, the second side wall configured to be flexibly movable relative to the first side wall, and
   a spring element contiguous with a second end of each of the first side wall and the second side wall, the spring element extending along at least a portion of the longitudinal extent of the hollow body and into the hollow body to be between the first side wall and the second side wall, the spring element biasing the first side wall and the second side wall to an expanded position of the hollow body from a compressed position of the hollow body;
   a closure on a first radial end of the hollow body, the closure including a solid portion for closing a first portion of the first radial end of the hollow body and leaving a second portion of the first radial end of the hollow body open, wherein the first radial end is a radially inner end of the hollow body; and
   a plurality of cooling passages in at least the first side wall and the second side wall, the plurality of cooling passages passing between the exterior surface and the interior surface of the hollow body.

2. The impingement insert of claim 1, further comprising a plurality of supports on the exterior surface of the first side wall and the second side wall of the hollow body to position the hollow body relative to an interior surface of a hollow cavity of the HGP component.

3. The impingement insert of claim 2, wherein in the compressed position, the hollow body is insertable in the hollow cavity of the HGP component, and in the expanded position, the hollow body expands to engage the interior surface of the hollow cavity of the HGP component.

4. The impingement insert of claim 1, wherein an end of the spring element adjacent the first radial end of the hollow body is free to move within the second portion of the first radial end of the hollow body not closed by the closure.

5. The impingement insert of claim 1, wherein the solid portion of the closure is configured to flex with the first side wall and the second side wall of the hollow body as the first side wall and the second side wall move between the expanded position of the hollow body and the compressed position of the hollow body.

6. The impingement insert of claim 1, further comprising a cover extending laterally outward on a second radial end of the hollow body opposing the first radial end of the hollow body, the cover configured to be coupled to the HGP component.

7. The impingement insert of claim 6, wherein the cover includes a plurality of spaced slots therein.

8. The impingement insert of claim 6, wherein the cover includes a gap defined therein at a location of the spring element at the second radial end.

9. The impingement insert of claim 6, wherein the cover further includes a triangular cover mounted over the spring element.

10. The impingement insert of claim 1, wherein the spring element includes a V-spring having a point thereof extending into the hollow body between the first side wall and the second side wall.

11. The impingement insert of claim 1, wherein the HGP component includes an airfoil having a hollow cavity therein, and wherein the hollow body is contiguous in a chordwise direction of the airfoil.

12. A hot gas path (HGP) component, comprising:
a component body having a hollow cavity therein;
an impingement insert for mounting in the hollow cavity, the impingement insert including:
a hollow body having a longitudinal extent, an exterior surface and an interior surface, the hollow body further including:
a first side wall,
a second side wall contiguous with the first side wall at a first end of each, the second side wall configured to be flexibly movable relative to the first side wall, and
a spring element contiguous with a second end of each of the first side wall and the second side wall, the spring element extending along at least a portion of the longitudinal extent of the hollow body and into the hollow body to be between the first side wall and the second side wall, the spring element biasing the first side wall and the second side wall to an expanded position of the hollow body from a compressed position of the hollow body; and
a plurality of cooling passages in at least the first side wall and the second side wall, the plurality of cooling passages passing between the exterior surface and the interior surface of the hollow body,
wherein the impingement insert further includes a closure on a first radial end of the hollow body, the closure including a solid portion for closing a first portion of the first radial end of the hollow body and leaving a second portion of the first radial end of the hollow body open, wherein the first radial end is a radially inner end of the hollow body.

13. The HGP component of claim 12, wherein the impingement insert further includes a plurality of supports on the exterior surface of the first side wall and the second side wall of the hollow body to position the hollow body relative to an interior surface of the hollow cavity.

14. The HGP component of claim 13, wherein in the compressed position, the hollow body is insertable in the hollow cavity, and in the expanded position, the hollow body expands to engage the interior surface of the hollow cavity.

15. The HGP component of claim 12, wherein an end of the spring element adjacent the first radial end of the hollow body is free to move within the second portion of the first radial end of the hollow body not closed by the closure.

16. The HGP component of claim 12, wherein the first portion of the closure is configured to flex with the first side wall and the second side wall of the hollow body as the first side wall and the second side wall move between the expanded position of the hollow body and the compressed position of the hollow body.

17. The HGP component of claim 12, wherein the impingement insert further includes a cover extending laterally outward on a second radial end of the hollow body opposing the first radial end of the hollow body, the cover configured to be coupled to the component body.

18. The HGP component of claim 17, wherein the cover includes a gap defined therein at a location of the spring element at the second radial end.

19. The HGP component of claim 12, wherein the spring element includes a V-spring having a point thereof extending into the hollow body between the first side wall and the second side wall.

20. The HGP component of claim 12, wherein the component body includes an airfoil, and wherein the hollow body is contiguous in a chordwise direction of the airfoil.

* * * * *